United States Patent [19]
Tamura et al.

[11] Patent Number: 4,547,628
[45] Date of Patent: Oct. 15, 1985

[54] DATA TRANSMISSION SYSTEM

[75] Inventors: Yasuyuki Tamura, Kawasaki; Masaki Nakaoka, Yokohama; Ken Miyagi, Yokohama; Nao Nogashima, Yokohama; Yasuhiko Sue, Yokohama; Masashi Suda, Iruma; Masao Ariga, Yokohama, all of Japan

[73] Assignee: Canon Kabushiki Kaisha, Tokyo, Japan

[21] Appl. No.: 710,529

[22] Filed: Mar. 12, 1985

Related U.S. Application Data

[63] Continuation of Ser. No. 473,647, Mar. 9, 1983, abandoned.

[30] Foreign Application Priority Data

Mar. 15, 1982 [JP] Japan .................................. 57-39378

[51] Int. Cl.[4] .......................... H04L 3/00; H04L 11/00
[52] U.S. Cl. .................................... 178/2 B; 340/721; 340/747; 340/706
[58] Field of Search ...................... 178/2 B, 23 R, 34; 340/721, 745, 728, 747, 751, 706

[56] References Cited

U.S. PATENT DOCUMENTS 3,967,268 6/1976 Roberts .............................. 340/745

*Primary Examiner*—Stafford D. Schreyer
*Attorney, Agent, or Firm*—Fitzpatrick, Cella, Harper & Scinto

[57] ABSTRACT

A data transmission system has a data converter for converting character code data into dot image data, and/or vice versa. The data converter has a memory and a pattern generator and/or a character recognition apparatus to perform such conversion. The system allows data transmission in either form with a smaller number of lines to connect respective stations, and also allows direct communication between the stations.

20 Claims, 9 Drawing Figures

DATA TRANSMISSION SYSTEM

This application is a continuation of application Ser. No. 473,647 filed Mar. 9, 1983, now abandoned.

BACKGROUND OF THE INVENTION

1. Field of the Invention

The present invention relates to a data transmission system for transmitting document or image data.

2. Description of the Prior Art

With recent developments in communication techniques, document or image data is transmitted through a public telecommunication line or a private communication line such as a coaxial cable or an optical fiber cable. Two methods are known for transmitting document data through a line; a method using character codes and a method using dot image data.

When document image data is transmitted using character codes, each character is transmitted with an 8- or 16-bit code which is obtained in accordance with a suitable standard such as JIS (JAPANESE INDUSTRIAL STANDARD) ASCII. In this case, only 8 or 16 bits are required for one character, so that a large amount of data may be transmitted at high speed. For this reason, this method is widely adopted in input/output of document data into or from a computer or transmission/ reception of document data prepared by a word processor.

In contrast to this, when document data or the like is transmitted in the form of dot image data, an image is generally divided into a dot matrix having $8 \times 8$ dots or $16 \times 16$ dots per 1 mm$^2$. Image or document data is transmitted with binary or quantized signals representing white or black dots. In this case, even if a dot matrix having $8 \times 8$ dots per 1 mm$^2$ is used, 64-bit data must be transmitted per 1 mm$^2$ of the image, resulting in an extremely large amount of data to be transmitted. Although band compression for transmitting by encoding such a dot array may be utilized, it only reduces the amount of data to be transmitted to 1/10 the original amount. Furthermore, when band compression is performed, a complex algorithm must be used for compression or expansion of data, thus itself interfering with high speed data transmission. However, only predetermined characters or symbols may be transmitted with the first method mentioned above, whereas any characters or figures may be transmitted by this second method utilizing dot image data. Moreover, since signals obtained by reading a document or the like with an image sensor consist of dot image data, it is hard to convert them into character codes but is relatively easy to transmit them without conversion.

Thus, both these methods have respective advantages and disadvantages and are therefore widely adopted.

When communication is performed through a private line as in a local area network, lines are conventionally installed for individual items of equipment. However, installation of a line is costly. Therefore, it is uneconomical to separately install both a line for transmission of data from a computer or a word processor in the form of character codes, and a line for transmission of dot image data read from an original by a high-speed facsimile or digital copier. It is therefore desired that both data representing a dot image and data representing character codes be transmitted through a single line.

However, even if a signal line can allow transmission of data of these different formats, it does not allow communication between a computer or a word processor which can only process character code data and a high-speed facsimile system or the like which can only process dot image data. However, it is practically convenient if a document prepared by equipment which can only process character code data such as a computer or a word processor may be produced (e.g., printed) by equipment which can only process dot image data such as a high-speed facsimile system. Conversely, it is very convenient if an original image read by a facsimile system or the like may be entered into a computer through a communication line.

In view of this, a character generator for converting dot image data into character codes is conventionally incorporated into a printer which can only process dot image data, so that the printer may be able to receive and print either character code data or dot image data. If dot image data from a facsimile system or the like is to be converted into character codes, a character recognition apparatus at the receiver side recognizes characters corresponding to a received dot image and converts the dot image into character codes.

A character generator or a character recognition apparatus is generally large in size and is expensive. For this reason, it is impractical to connect such a character generator or character recognition apparatus to all the printers and computers connected to the line.

It is also impossible to directly connect a device which can only process compressed data with a device which can only process dot image data.

SUMMARY OF THE INVENTION

The present invention has been made in view of this and has for its object to provide a novel data transmission system.

More particularly, it is an object of the present invention to provide a data transmission system which allows effective utilization of a line by performing data transmission in the form of either character codes or dot image data.

It is another object of the present invention to provide a data transmission system which is connected to a line, and which has a function of transmitting/receiving data to/from other stations, so that it receives character code data or dot image data, converts the received character code data into dot image data or vice versa, and transmits the converted data to a desired station.

The above and other objects, features and advantages of the present invention will become apparent from the following description taken in conjunction with the accompanying drawings.

DETAILED DESCRIPTION OF THE PREFERRED EMBODIMENT

The preferred embodiment of the present invention will now be described with reference to the accompanying drawings.

Figure 1:
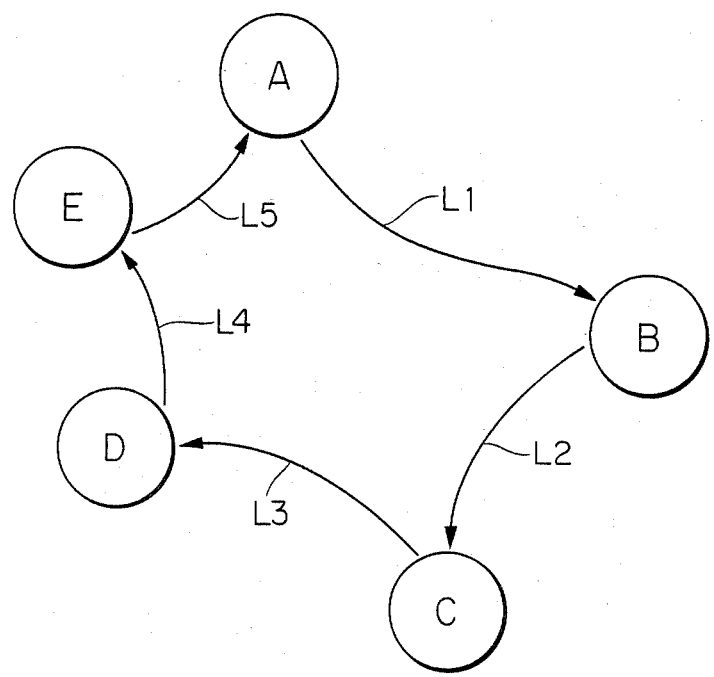
FIG. 1 is a diagram for explaining the principle of operation of the present invention as applied to a loop-connected data transmission system.
Figure 2:
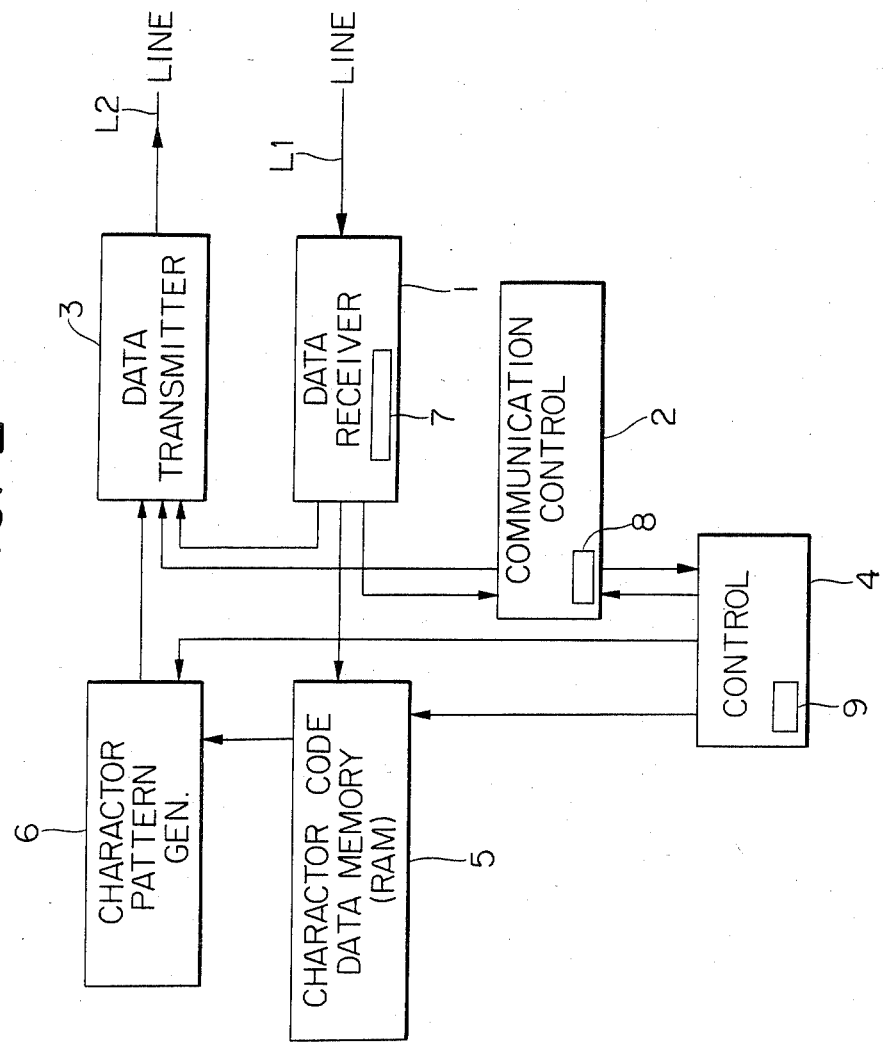
FIG. 2 is a block diagram showing a data converter according to an embodiment of the present invention.

FIGS. 1 and 2 show a case wherein a data converter for converting character code data into dot image data is connected in a so-called loop independently of other stations. Referring to FIG. 1, symbols A, B, C, D and E respectively denote stations connected to the loop. Lines L1 to L5 connect each pair of adjacent stations A, B, C, D and E. Although any lines may be used for lines L1 to L5, lines of optical fiber may be conveniently used if large amounts of data are to be transmitted at high speed. Arrows between the respective stations in the figure denote the direction of data transmission. Among these stations is a station comprising a computer system A which mainly processes character code data involving numbers, letters and so on. An image sensor B such as a CCD generates and transmits dot image data. A printer C such as a laser beam printer receives the dot image data and prints accordingly. A word processor D has a function of preparing a document in the form of character code data and a function of printing the document in accordance with the character code data. The word processor D can also transmit/receive character code data. A data converter E has a converting function to be described later.

The operation sequence of the system will now be described when the converting function of the data converter E is not used. When a document prepared by the computer system A is transmitted to the word processor D and is printed by its printer, the computer system A first confirms whether the line is busy or in the unreceivable state, that is, if it is being used by another station. If the line is not busy, the computer system A transmits the destination address of the word processor D and a command representing the data format involved (including data which indicates that the data is to be printed, data which indicates that the data involved in character code data in accordance with the JIS codes, data on the size of each character, and so on). The address and the command from the computer system A are transmitted to the word processor D through the stations B and C. If the word processor D is in a state wherein it may immediately receive the transmitted data, it transmits to the computer system A a receivable command representing that it can receive the data. The receivable command from the word processor D is thus transmitted to the computer system A through the data converter E. In response to the receivable command, the computer system A transmits the character code data to be transmitted to the word processor D through the stations B and C. The word processor D receives and prints the character code data, while it transmits a receiving confirmation command to the computer system A through the data converter E until transmission is completed. In this manner, data is transmitted from the computer system A to the word processor D.

Data transmission between other stations may also be performed in a similar manner to that described above; for example, transmission of character code data from the word processor D to the computer system A or transmission of dot image data from the image reader B to the printer C.

In this manner, character code data or dot image data may be transmitted through a line in accordance with the present invention. However, data transmission from, for example, the computer system A to the printer C is impossible with the conventional system. This is because the computer system A can only process character code data, while the printer C can only process dot image data and therefore cannot receive and print character code data.

A case of data transmission will now be described in which the data converter E is connected to the line. When data is to be transmitted from the computer system A to the printer C, the computer system A first confirms whether the line is busy. If the line is not busy, the computer system A transmits the address of the data converter E which is to receive the transmitted data first and a command representing the data format (whether it is character code data or dot image data). The command includes the normal data and the destination address of the station which is to finally receive the data (the address of the printer C in this case). The data converter E receives the address of the printer C through the stations B, C and D. Subsequently, as in the case of the word processor D described above, the data converter E receives the character code data from the computer system A. The data converter E temporarily stores the character code data and the destination address of the station which is to finally receive the data. When reception of the character code data is completed, the data converter E confirms whether the line is busy. If the line is not busy, the data converter E transmits the destination address of the printer C, which is to finally receive the data, the address being stored in the memory described above. The data converter E also transmits a command representing the data format. The data format represented by the command here represents dot image data, unlike the case of data transmission from the computer system A to the data converter E. Thereafter, the data is transmitted from the data converter E to the printer C in a conventional manner. During data transmission, the data converter E serves to convert the character code data read out from the memory described above into dot image data, and to transmit the dot image data.

FIG. 2 shows the internal configuration of a data converter for converting character code data to dot image data according to an embodiment of the present invention, which may be suitably used in the example described above. A signal transmitted through the line L1 is received by a data receiver 1 and is first stored in a command register 27 therein. A communication control 2 checks the destination address of the received data. If the destination address does not coincide with that of the data receiver 1, the communication control 2 directly transmits all the data stored in the command register 27 to a data transmitter 3 which transmits the data onto the line L2. On the other hand, if the destination address coincides with that of the data receiver 1, the communication control 2 checks if the subsequent data is character code data or not. If the data to be received next is character code data, the communication control 2 communicates with a control 4 so as to confirm if the communication control 2 is in the receivable state. If the communication control 2 is in the receivable state, it transmits a receivable command onto the line L2 through the data transmitter 3. The destination address included in the received data is stored in a memory included in the communication control 2. The received character code data is supplied to a character code data memory 5 which can store data corresponding to at least one page of the document or original. The character code memory 5 may comprise a semiconductor RAM, a magnetic disc device or the like.

While the data is received in this manner, the communication control 2 continuously transmits a receiving confirmation command through the data transmitter 3. After all the data is received, the communication control data 2 confirms that the data receiver 1 is no longer receiving any data. When the data receiver 1 is no longer receiving any data, it is discriminated that the line is not occupied by any station and the line is not busy. Subsequently, the communication control 2 transmits to the data transmitter 3 the destination address which was stored in the memory 8 therein, and also the command representing that the data be transmitted as dot image data. The address and the command are transmitted onto the line L2 from the data transmitter 3. When the data receiver 1 receives a receivable command from the destination station, the communication control 2 decodes the command and transmits a signal to the control 4. In response to the signal, the control 4 immediately starts operating the character code data memory 5 and a character pattern generator 6. More specifically, the data stored in the character code memory 5 is sequentially transmitted to the character pattern generator 6 which then generates image data corresponding to the character code data. The image data thus generated is transmitted in units of lines to the data transmitter 3 which transmits the received data onto the line L2. In this manner, the conversion from character code data into dot image data is completed.

Figures 3, 3C:
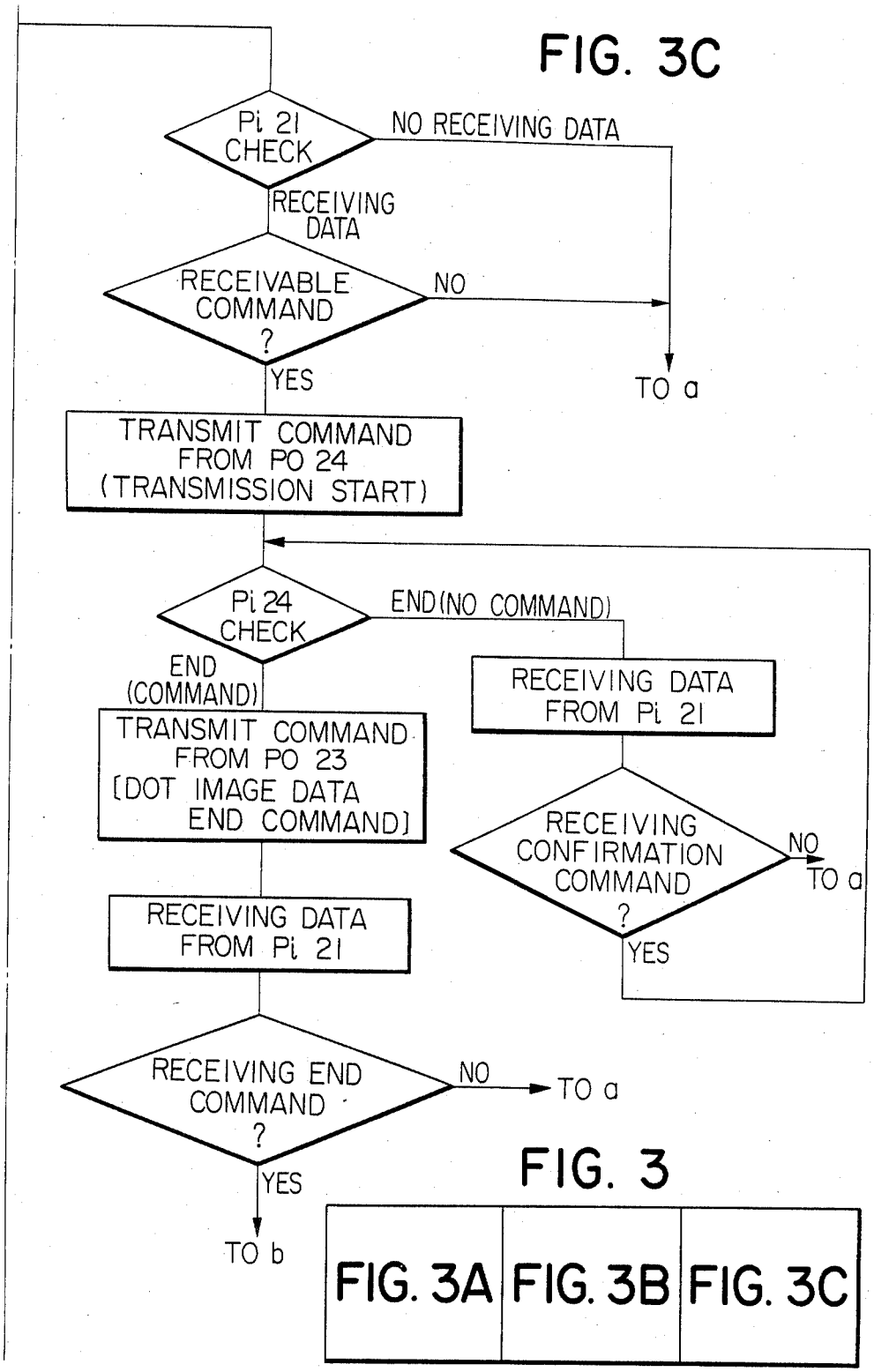
FIGS. 3 composed of FIGS. 3A, 3B and 3C and 4 composed of FIGS. 4A and 4B are flowcharts showing the operation sequence of a communication control and a control, respectively.
Figure 3A:
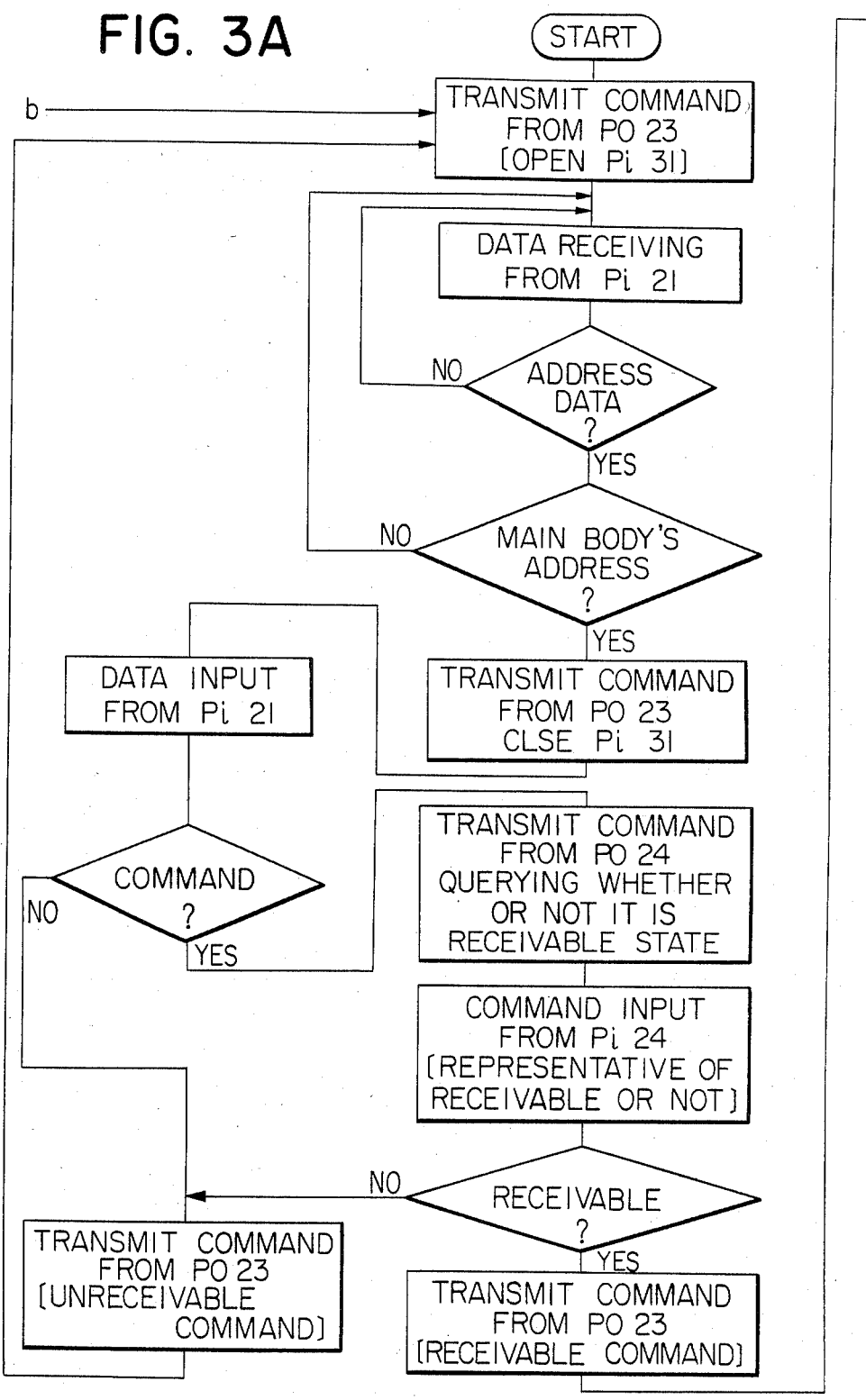
Figure 4A:
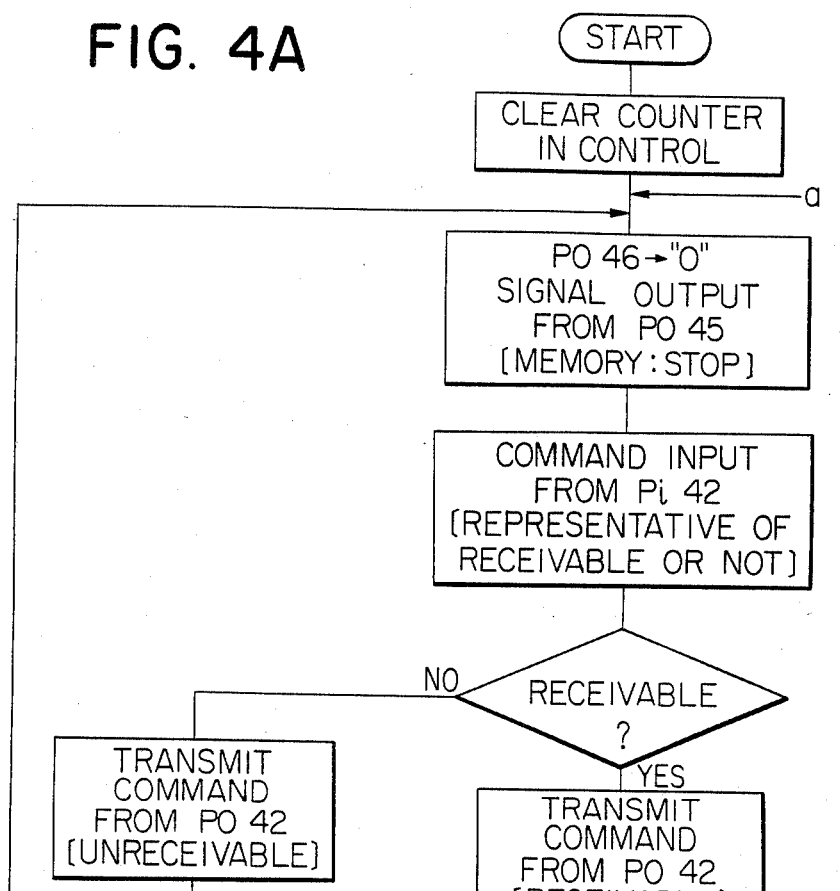
Figure 4:
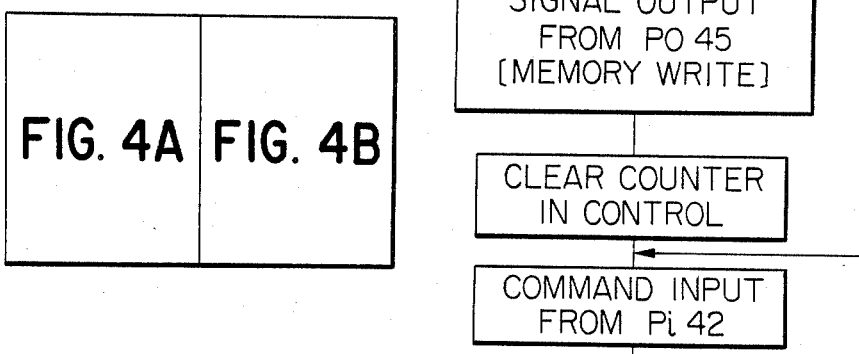
Figure 4B:
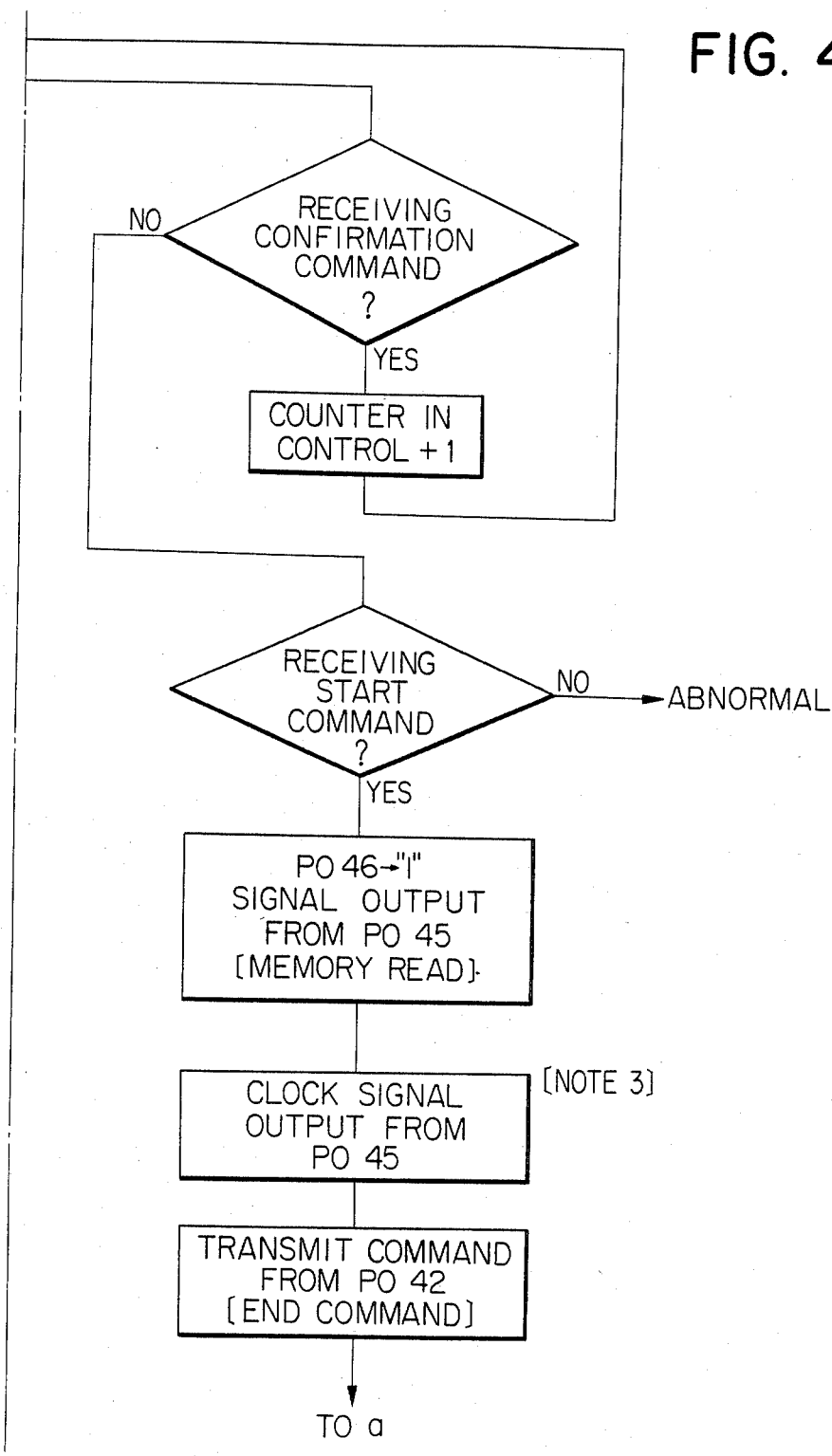

FIGS. 3 and 4 show the flowcharts showing the operation sequences of the communication control 2 and the control 4, respectively.

Referring to these flowcharts, the input/output ports of each station are designated in the following manner. Po indicates an output port while Pi indicates an input port; the first digit of the two-digit numeral following it indicates the station (FIG. 2) of the port whereas the second digit thereof indicates the station (FIG. 2) to which it is connected -#.

While the data receiver 1 is receiving data, it constantly produces the data onto output ports Po12, Po13 and Po15. In response to a command received from an input port Pi32, the data transmitter 3 opens/closes an input port Pi31. When the input port Pi31 is open, the data received from the data transmitter 1 through the input port Pi31 is transmitted onto the line L2. On the other hand, when the input port Pi31 is closed, the data received from the character pattern generator 6 through the input port Pi36 is transmitted onto the line L2.

The data transmitter 3 transmits onto the line L2 the data (commands) received through the input port Pi32 except for the command (for opening/closing Pi31) relating to control of the data transmitter 3.

In response to a signal received through an input port Pi54, one of the statuses of the character code data memory 5, that is, one of the OFF status, the memory write status and the memory read status, is selected. When the memory write status is selected, the data received from the data receiver 1 through the line L1 and an input port Pi51 is sequentially written into the character code data memory 5 from its start address. The timing of this write operation is controlled in accordance with the timing at which the data is received at the input port Pi51.

When the memory read status is selected, the character code data is read out from the start address of the character code data memory 5 in synchronism with a clock signal applied to the input port Pi51. The readout data is transmitted to the character pattern generator 6 through an output port Pi56. If required, the same data is repeatedly produced a predetermined number of times. That is, the same data may be transmitted a number of times in order to convert a single character.

The ON and OFF statuses of the character pattern generator 6 are selected through an input port Pi64. The character generator 6 converts the character code data received through an input port Pi65 into dot image data. The dot image data is produced through an output port Po61. Data conversion is performed in synchronism with the data received through the input port Pi65.

Referring to FIG. 4, whether data may be received or not is discriminated in accordance with the following algorithm. That is, if all of the criteria (1) to (3) below are satisfied, YES is obtained. NO is obtained in any other case.

(1) The count of a counter 9 within the control 4 is 0. (The count of the counter 9 represents the number of characters which are shored in the character code data memory 5).

(2) A detection signal from a power voltage detector (not shown) indicates a normal value.

(3) A detection signal from an abnormality detector (not shown) indicates a normal value.

If NO is obtained in the step for checking whether the received command is a receiving start signal, the status of the data converter is determined to be abnormal and this is indicated by a lamp at a display portion (not shown) of the data converter. Also if a command other than expected is received in the flowchart shown in FIG. 4, the same lamp is turned on.

Referring to FIG. 4, clock signals for timing control of the read operation of the character code data memory 5 are transmitted at predetermined intervals. The count of the counter 9 in the control 4 is decremented in units of 1 each time it reaches N (where N is a positive integer determined in accordance with the number of dots of a character and the word length of the character pattern generator 6). When the count of the counter 9 reaches 0, it is determined that all the character codes have been read out from the character code data memory 5. Then, no more clock signals are produced. Therefore, one character code is converted into dot image data for every N clock signals (count thereof).

In the description made referring to FIGS. 1 and 2, conversion from character code data into dot image data is described. However, conversion from dot image data into character code data may be performed with a similar data converter. In this case, a memory for storing the dot image data is provided in place of the character code data memory 5, and a character recognition apparatus utilizing an OCR (OPTICAL CHARACTER RECOGNITION) technique is provided in place of the character pattern generator 6. In this case, it is possible to transmit character codes one by one from the character recognition apparatus. However, it is more convenient if a memory is incorporated for temporarily storing the character code data. The character code data may thus be stored in the memory unit the dot image data is entirely converted into character code data, and the character code data may then be transmitted in its entirety. This is because conversion from dot image data into character code data requires a considerably long period of time, while transmission of the character code data requires only a short period of time. Thus, if the data converter occupies the line for a time period required for conversion of dot image data into character code data, the usage efficiency of the line is degraded. It is also to be noted that a data converter may have both functions; that of converting character code data into dot image data, and vice versa.

In this manner, the data converter receives the data connected to the line and stores the destination address, included in the received data, of the station which is to finally receive the data. The received character code or dot image data is temporarily stored, and the character code data is converted into the dot image data, or vice versa. The converted data is transmitted to the station represented by the destination address. In accordance with such a data converter, connection of a single data converter to a set of lines allows communication between any station which can only process character code data and any other station which can only process dot image data.

If a data converter is arranged in a conventional station, it may be commonly used by a plurality of stations so as to allow effective use of available space.

If the data converter has one or both of a function for compressing dot image data and a function for expanding the compressed data, a station which can only process compressed data and another station which can only process non-compressed data may be connected through a line for allowing communication therebetween.

A plurality of ROMs for storing various types of tables for conversion of character code data into dot image data in correspondence with various standards may be incorporated and may be switched as needed; a new line need not be installed but only a switch mode between these ROMs if the standards of stations connected to the line are changed for some reason.

The above description has been made with reference to lines which are connected to form a closed loop. However, the present invention may be similarly applied to lines which are connected in any other configuration.

What is claimed is:

1. A data transmission system for transmitting data through a data transmission line, comprising:
    a first station for sending character code data onto the data transmission line;
    a second station for sending image data onto the data transmission line;
    a third station for processing any one of the character code data and the image data received from the data transmission line; and
    a converting station for receiving data sent from at least one of said first and second stations through the data transmission line, for converting data, between the character code data and the image data, which cannot be processed by said third station, into data which can be processed by said third station, and for sending out the data which can be processed by said third station onto the data transmission line.

2. A system according to claim 1, wherein said first station comprises word-processing means for creating a sentence and generating the character code data corresponding thereto.

3. A system according to claim 1, wherein said second station comprises read means for reading an image by an image sensor and generating the image data representing black/white information of the image.

4. A system according to claim 1, wherein said converting station comprises memory means for storing a conversion table for converting the character code data or the image data to the image data or the character code data, respectively.

5. A data transmission system according to claim 1, wherein said stations are connected in a closed loop by a data transmission line.

6. A data transmission system for transmitting data through a data transmission line, comprising:
    a first station for sending character code data onto the data transmission line;
    a second station for sending the character code data onto the data transmission line, said second station being different from said first station;
    a third station for receiving the character code data sent from said first and second stations through the data transmission line, and converting the received character code data to image data which is sent onto the data transmission line; and
    a fourth station for receiving the image data sent from said third station through the data transmission line and processing the received image data.

7. A data transmission system according to claim 7, wherein said stations are connected in a closed loop by a data transmission line.

8. A system according to claim 6, wherein at least one of said first and second stations comprises word-processing means for creating a sentence and generating the character code data corresponding thereto.

9. A system according to claim 6, wherein said fourth station comprises print means for printing an image in accordance with the received image data.

10. A system according to claim 6, wherein said third station comprises memory means for storing a conversion table for converting the character code data to the image data.

11. A system according to claim 6, wherein said third station comprises data memory means for storing the character code data corresponding to a page of a document.

12. A data transmission system for transmitting data through a data transmission line, comprising:
    a transmitting station for sending character code data onto the data transmission line;
    a plurality of receiving stations, each of which receives image data from the data transmission line, can process the received image data and has a respective address associated therewith; and
    a converting station including memory means for storing the addresses of said receiving stations, an address of the receiving station being included in the data from said transmitting station to indicate the destination of the data, converting means for receiving the character code data sent from said transmitting station through the data transmission line and converting the received character code data to the image data, and means for transmitting, through the data transmission line, the image data from said converting means to the receiving station represented by the address stored in said memory means.

13. A system according to claim 12, wherein said converting station comprises data memory means for storing the character code data corresponding to a page of a document.

14. A system according to claim 12, wherein said transmitting station comprises word-processing means for creating a sentence and generating the character code data corresponding thereto.

15. A system according to claim 12, wherein said receiving station comprises print means for printing an image in accordance with the received image data.

16. A system according to claim 12, wherein said converting means comprises store means for storing a conversion table for converting the character code data to the image data.

17. A data transmission system for transmitting data through a data transmission line, comprising:

a first station for sending one of character code data and image data onto the data transmission line;

a second station for processing the character code data received from the data transmission line;

a third station for processing the image data received from the data transmission line; and a converting station for receiving the data from said first station through the data transmission line, converting data, which cannot be processed by one of said second and third stations which is designated by said first station, to data which can be processed thereby, and sending, through the data transmission line, the data which can be processed to said one of said second and third stations which is designated by said first station.

18. A system according to claim 17, wherein said first station comprises one of word-processing means for creating a sentence and generating the character code data corresponding thereto, and reader means for reading an image by an image sensor and generating the image data representing black/white information of the image.

19. A system according to claim 17, wherein said converting station comprises memory means for storing a conversion table for converting the character code data or the image data to the image data or the character code data, respectively.

20. A system according to claim 17, wherein said stations are connected in closed loop by a data transmission line.

* * * * *

UNITED STATES PATENT AND TRADEMARK OFFICE
CERTIFICATE OF CORRECTION

PATENT NO. : 4,547,628

DATED : October 15, 1985

INVENTOR(S) : YASUYUKI TAMURA, ET AL.

It is certified that error appears in the above-identified patent and that said Letters Patent is hereby corrected as shown below:

ON COVER PAGE:

Change "Nao Nogashima" to --Nao Nagashima--.

Figure 3B:
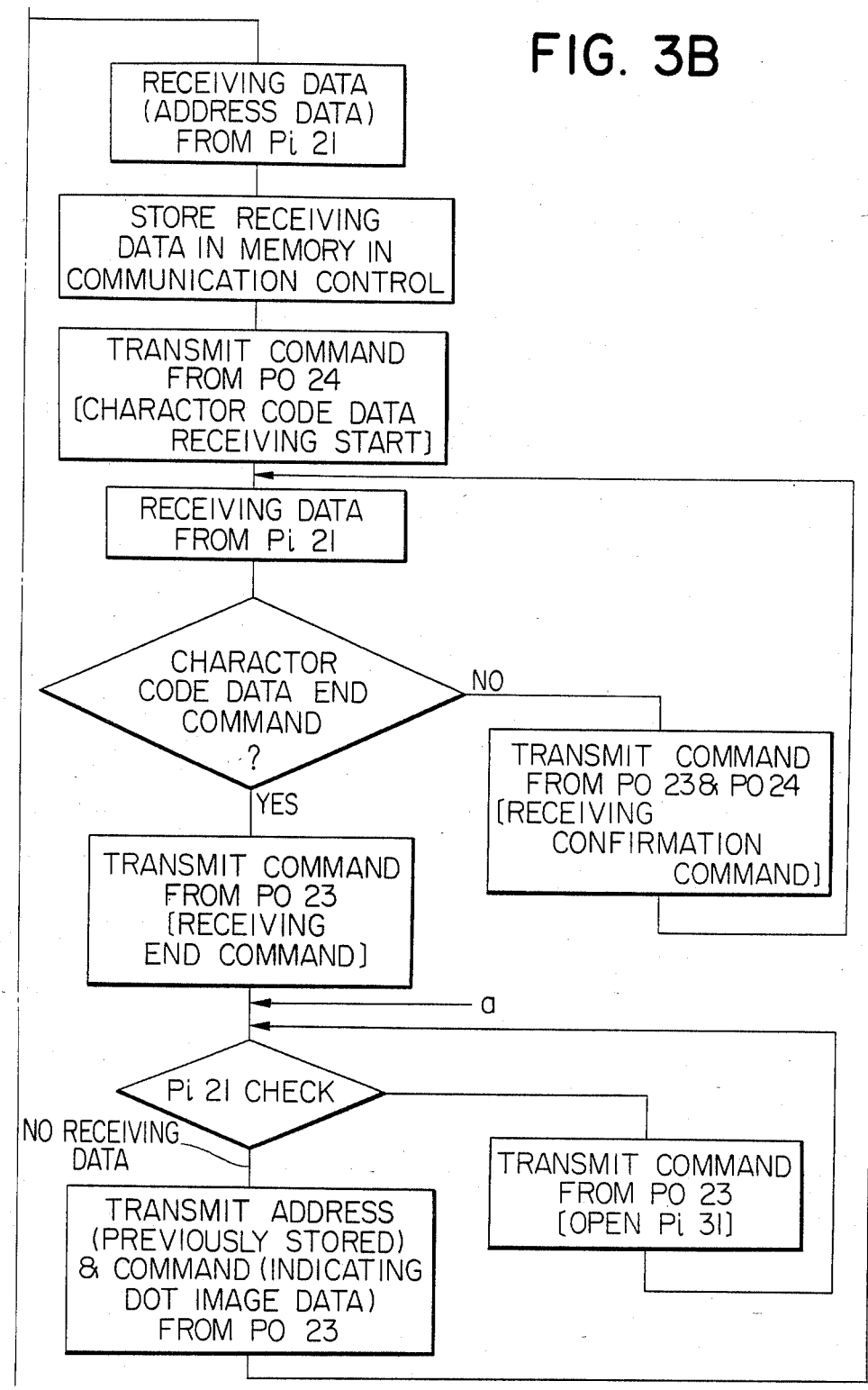

IN THE DRAWINGS:

Fig. 2, Block 5, change "CHARACTOR" to --CHARACTER--;
Fig. 2, Block 6, change "CHARACTOR" to --CHARACTER--;
Fig. 3B, change "[CHARACTOR CODE DATA" to --[CHARACTER CODE DATA-- and change "CHARACTOR CODE DATA END" to --CHARACTER CODE DATA END--; and
Fig. 4A, change "[CHARACTOR CODE DATA" to --[CHARACTER CODE DATA--.

Column 1, line 17, change "line; a" to --line: a--;
line 28, change "mission/ reception" to --mission/reception--; and
line 67, change "signal line" to --single line--.

Column 3, line 36, change "in character" to --is character--.

UNITED STATES PATENT AND TRADEMARK OFFICE
CERTIFICATE OF CORRECTION

PATENT NO. : 4,547,628

DATED : October 15, 1985

INVENTOR(S) : YASUYUKI TAMURA, ET AL.

It is certified that error appears in the above-identified patent and that said Letters Patent is hereby corrected as shown below:

Column 5, line 3, delete "data" (first occurrence).

Column 6, line 18, change "are shored" to --are stored--; and line 58, change "unit the dot" to --until the dot--.

Column 7, line 1, change "functions; that" to --functions: that--; and line 7, change "temporarity" to --temporarily--.

Column 8, line 21, change "claim 7" to --claim 6--.

Signed and Sealed this

Ninth Day of September 1986

[SEAL]

Attest:

DONALD J. QUIGG

Attesting Officer

Commissioner of Patents and Trademarks